US009242591B2

(12) United States Patent
Ehrlich (10) Patent No.: US 9,242,591 B2
(45) Date of Patent: Jan. 26, 2016

(54) INSERT FOR LOGISTICS SLOT IN LOGISTICS STRIP ASSEMBLY

(71) Applicant: WABASH NATIONAL, L.P., Lafayette, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/470,461

(22) Filed: Aug. 27, 2014

(65) Prior Publication Data
US 2015/0078804 A1 Mar. 19, 2015

Related U.S. Application Data (60) Provisional application No. 61/879,903, filed on Sep. 19, 2013.

(51) Int. Cl.
*B60P 7/08* (2006.01)
*B62D 33/04* (2006.01)

(52) U.S. Cl.
CPC ............. *B60P 7/0807* (2013.01); *B62D 33/046* (2013.01)

(58) Field of Classification Search
CPC ...... B62D 25/00; B62D 25/02; B62D 29/045; B62D 33/00; B62D 33/02; B62D 33/04; B62D 33/046; F16B 5/02; F16B 5/0241; F16B 5/04
See application file for complete search history.

(56) References Cited

U.S. PATENT DOCUMENTS

| | | | | |
|---|---|---|---|---|
| 4,222,606 A | * | 9/1980 | Brown et al. | 296/186.1 |
| 4,958,472 A | * | 9/1990 | Ehrlich | 52/578 |
| 5,066,066 A | * | 11/1991 | Yurgevich et al. | 296/186.1 |
| 5,112,099 A | * | 5/1992 | Yurgevich et al. | 296/186.1 |
| 5,700,118 A | * | 12/1997 | Bennett et al. | 410/113 |
| 5,860,693 A | * | 1/1999 | Ehrlich | 296/191 |
| 5,934,849 A | * | 8/1999 | Haire | 410/113 |
| 5,997,076 A | * | 12/1999 | Ehrlich | 296/186.1 |
| 6,003,932 A | * | 12/1999 | Banerjea et al. | 296/186.1 |
| 6,010,020 A | * | 1/2000 | Abal | 220/1.5 |
| 6,199,939 B1 | * | 3/2001 | Ehrlich | 52/582.1 |
| 6,220,651 B1 | * | 4/2001 | Ehrlich | 296/186.1 |
| 6,450,564 B1 | * | 9/2002 | Sill | 296/186.1 |
| 6,652,019 B1 | * | 11/2003 | Bennett | 296/186.1 |
| 7,152,912 B1 | * | 12/2006 | Roush et al. | 296/186.1 |
| 7,500,713 B2 | * | 3/2009 | Riley et al. | 296/191 |
| 8,016,152 B2 | * | 9/2011 | Roush et al. | 220/652 |
| 2007/0110538 A1 | * | 5/2007 | Roush et al. | 410/115 |
| 2008/0111393 A1 | * | 5/2008 | Ehrlich | 296/186.5 |
| 2010/0078964 A1 | * | 4/2010 | Wylezinski et al. | 296/186.1 |
| 2011/0204678 A1 | * | 8/2011 | Katz et al. | 296/186.1 |

* cited by examiner

*Primary Examiner* — Daniel Wiley
(74) *Attorney, Agent, or Firm* — Carli E. Stewart (57) ABSTRACT

A logistics assembly is configured to be coupled to a sidewall of a trailer. The logistics assembly includes a logistics strip configured to be coupled to an inside surface the sidewall of the trailer and a splicing plate configured to be coupled to an outside surface the sidewall of the trailer. The splicing plate is spaced-apart from the logistics strip to define a channel therebetween, and the logistics strip includes a plurality of vertically-spaced slots aligned with the channel. The logistics assembly further includes an insert engaged with the logistics strip and the splicing plate. The insert is configured to block access from inside the trailer through at least one slot of the logistics strip in order to prevent debris from entering through the slot and into a channel between the logistics strip and the splicing plate.

12 Claims, 10 Drawing Sheets

INSERT FOR LOGISTICS SLOT IN LOGISTICS STRIP ASSEMBLY

This application claims priority under 35 U.S.C. §119(e) to U.S. Provisional Patent Application Ser. No. 61/879,903 entitled INSERT FOR LOGISTICS SLOT IN LOGISTICS STRIP ASSEMBLY and filed Sep. 19, 2013, the entirety of which is hereby incorporated by reference herein.

FIELD OF THE INVENTION

The present invention relates generally to semi-trailers, such as van-type trailers, for example. In particular, the present invention relates to a sidewall construction for such a semi-trailer which includes a logistics strip assembly having logistics apertures, or slots, for enabling engagement of restraining equipment and straps to the sidewall of the trailer.

BACKGROUND OF THE INVENTION

The sidewalls of trailers often include logistics strip assemblies in order to enable engagement of restraining equipment and straps to the sidewall of the trailer. In particular, the logistics strips typically include one or more slots configured to receive a logistics clip attached to a logistics strap or cable used to secure cargo within the storage container of the trailer. Debris from within the storage container of the trailer may enter the logistics strip assembly via one of the apertures, or slots, of the assembly. Such debris may accumulate between the logistics strip and a splicing plate of the logistics strip assembly to cause contamination and/or corrosion.

SUMMARY

The present invention may comprise one or more of the features recited in the attached claims, and/or one or more of the following features and combinations thereof.

According to one aspect of the present disclosure, a logistics assembly is configured to be coupled to a sidewall of a trailer. The logistics assembly includes a logistics strip configured to be coupled to an inside surface the sidewall of the trailer, and a splicing plate configured to be coupled to an outside surface the sidewall of the trailer. The splicing plate is spaced-apart from the logistics strip to define a channel therebetween. The logistics strip including a plurality of vertically-spaced slots aligned with the channel. The logistics assembly further includes an insert engaged with the logistics strip and the splicing plate. The insert is configured to block access from inside the trailer through at least one slot of the logistics strip in order to prevent debris from entering through the slot and into a channel between the logistics strip and the splicing plate.

In one illustrative embodiment, the insert may be engaged with an edge of the logistics strip defining at least one of the plurality of slots.

In another illustrative embodiment, the insert may be a deformable foam. Illustratively, the insert may define a height and a width that is greater than a height and a width of the at least one slot. Further illustratively, the foam may include an outer surface having an adhesive attached thereto such that foam may be adhesively coupled to the splicing plate. The insert may be configured to be deformed by hand and inserted from the inside of the trailer through the logistics slot and into the channel between the logistics strip and the splicing plate. Further, the insert may define a length substantially the same as a length of the logistics strip such that the insert may operate to block each of the plurality of logistics slots of the logistics strip.

In yet another illustrative embodiment, the logistics assembly may further include a plurality of inserts. Each insert may be configured for use with each one of the plurality of vertically-spaced slots of the logistics strip.

In still another illustrative embodiment, the insert may include a plate configured to be placed over the slot and a lip configured to be placed within the slot in order to secure the insert over the slot. Illustratively, the insert may be removably coupled to the logistics strip.

In another illustrative embodiment, the insert may be positioned within the channel between the logistics strip and the splicing plate. Illustratively, the insert may be generally J-shaped. Further illustratively, the insert may include a vertical portion adjacent to an inner surface of the splicing plate and a curved portion curved toward the outside surface of the logistics strip. Illustratively, debris which enters the channel may be captured by the insert and urged to exit the logistics slot. The insert may be associated with a bottom-most slot of the plurality of logistics slots.

In yet another illustrative embodiment, the insert may be adhesively coupled to the splicing plate.

In still another illustrative embodiment, insert may be removably received within the slot.

According to another aspect of the present disclosure, a logistics assembly is configured to be coupled to a sidewall of a trailer. The logistics assembly includes a logistics strip configured to be coupled to the sidewall of the trailer. The logistics strip includes a slot configured to receive a logistics clip therein. The logistics assembly further includes an insert engaged with the logistics strip at a location adjacent the slot. Illustratively, the insert prevents debris from moving through the slot to a location adjacent an outside surface of the logistics strip. Illustratively, the insert may be engaged with the outside surface of the logistics strip.

According to still another aspect of the present disclosure, a sidewall of a trailer includes an aperture formed therein. The aperture is configured to receive a logistics clip therein. The sidewall further includes an insert configured to be removably received within a channel of the sidewall that is in communication with the aperture in order to prevent debris from entering the channel through the aperture.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

A trailer (not shown) of the present disclosure includes a sidewall 14 having a plurality of sidewall panels 16 connected together by a logistics strip assembly 10. As is discussed in greater detail below, the logistics strip assembly 10 includes a logistics strip 20 coupled to an inside surface 30 of each sidewall panel 16, a splicing plate 22 coupled to an outside surface 32 of each sidewall panel 16, and an insert 24 associated with each aperture, or slot, 26 of the logistics strip 20. The insert 24 operates to prevent debris from within the storage container of the trailer from entering the logistics strip assembly through slots 26 of the logistics strip 20 and collecting within a cavity or channel 15 between the logistics strip 20 and the splicing plate 22. Such debris may contaminate the cargo within the storage container of the trailer and/or may corrode the logistics strip assembly 10 and/or the sidewall 14 of the trailer.

Figure 1:
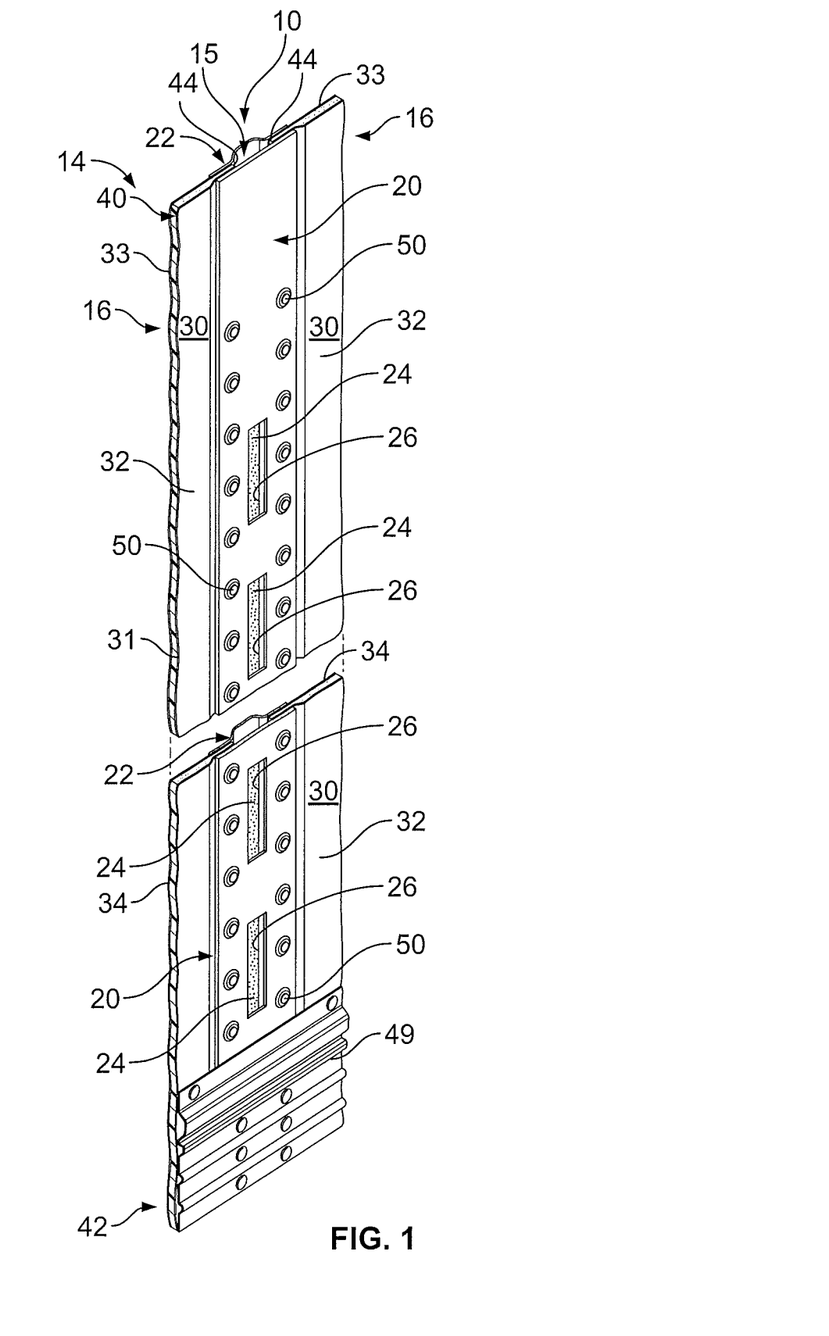
FIG. 1 is a perspective view of the inside of an illustrative sidewall of a trailer of the present disclosure including a plurality of logistics strip assemblies (only one of which is shown) which each include a logistics strip and a foam insert associated with each aperture, or slot, of the logistics strip in order to prevent debris from entering the logistics strip assembly through the slot.
Figure 2:
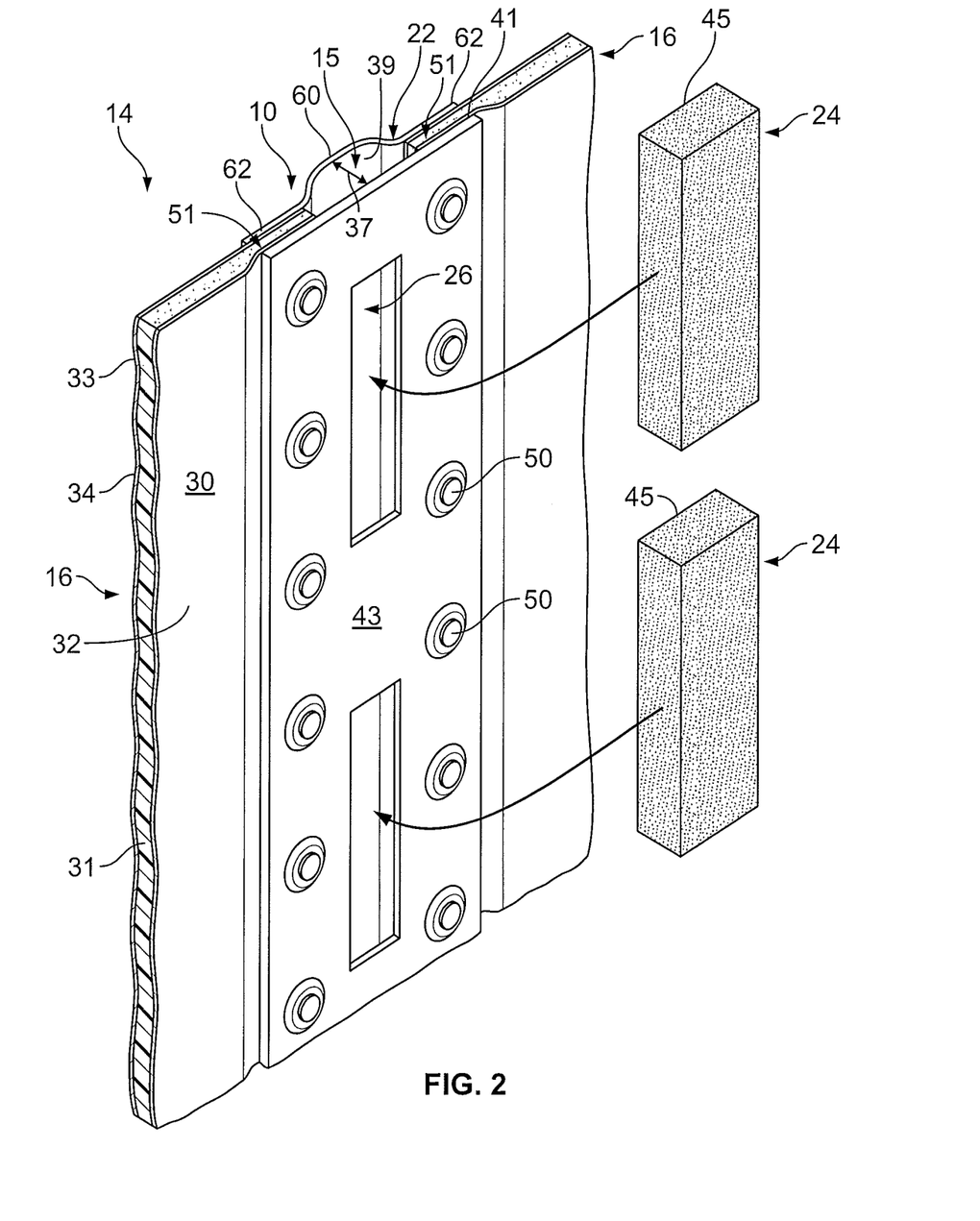
FIG. 2 is an exploded perspective view of a portion of the logistics strip assembly showing the inserts of the assembly to be placed within respective slots of the logistics strip.
Figure 3:
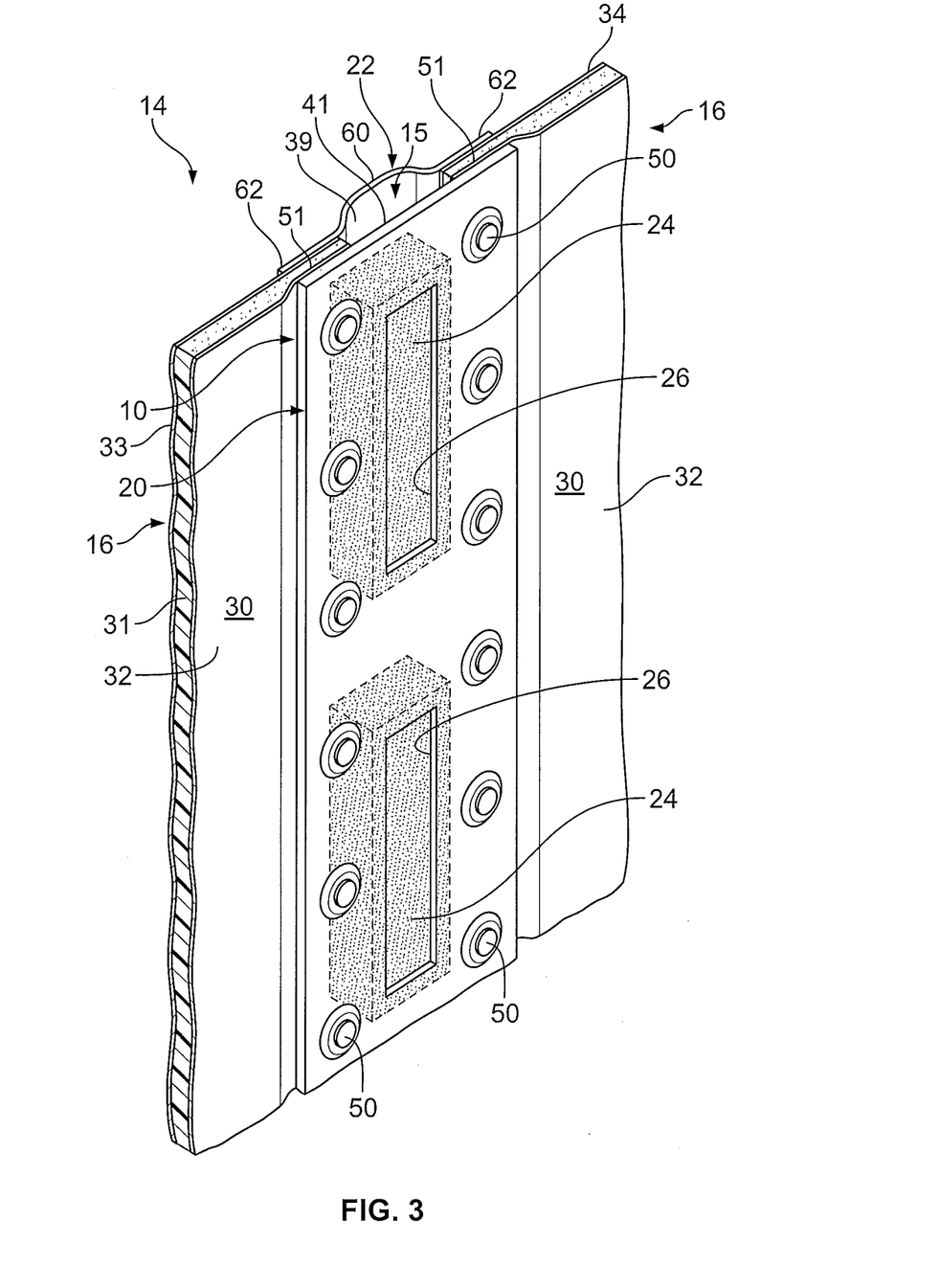
FIG. 3 is a perspective view similar to FIG. 2 showing the foam inserts within the respective slots of the logistics strip.

Looking to FIGS. 1-3, as noted above, the sidewalls 14 of the trailer include a plurality of sidewall panels 16. Illustratively, each panel 16 is made of a composite material. For example, the composite material includes a plastic core 31 and inner and outer metal skins 32, 34 coupled to the plastic core 31. Such a composite material provides a rigid, but lightweight and durable material. Illustratively, for example, each wall 32 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may be used as well. Further, the sidewall panels 16 may be made of any number of suitable, non-composite materials such as metals, metal alloys, and/or plastics, for example.

As shown in FIGS. 1-3, each logistics strip 20 is coupled to the inside surface 30 of the inner metal skin 32 of two adjacent panels 16 of the sidewall 14. Illustratively, each panel 16 includes a top end 40, a bottom end 42, and two sides 44. A bottom rail 49 of the trailer 10 is coupled to the bottom end 42 of the panels 16 and extends along a length of the sidewall 14 of the trailer 10. The sides 44 of adjacent panels 16 are spaced-apart from each other, as best shown in FIGS. 2 and 3, in order to create a channel, or gap 15, therebetween. The sides 44 of the panels 16 are spaced-apart from each other when joined by the logistics strip 20 and the splicing plate 22 such that an air pocket or channel 15 is formed between the logistics strip 20 and the splicing plate 22. The inner metal skin 32 located along the sides 44 of each panel 16 is stepped, or coined, inwardly and the plastic core 31 associated therewith is made thinner in order to create a stepped portion 51 on each side 44 of each panel 16. Thus, the stepped portions 51 of adjacent panels 16 create an indentation configured to receive the logistics strip 20 therein such that the logistics strip 20 is substantially flush with the inner surface 36 of each sidewall 16.

As shown in FIGS. 2 and 3, each logistics strip 20 defines a long, rectangular sheet of metal including a plurality of rectangular apertures, or slots, 26 formed therethrough. As shown in FIGS. 2 and 3, the slots 48 are vertically-spaced apart from each other along a vertical centerline of the logistics strip 20. The slots 26 are located within a center portion of the strip 20 and are aligned with the gap 15 between the adjacent sidewall panels 16. The slots 26 are provided to receive a clip or other attachment device therethrough in order to secure cargo within the trailer. Each logistics strip 20 is coupled to the adjacent sidewall panels 16 by rivets 50. As shown in FIGS. 2 and 3, the rivets 50 are vertically-spaced apart from each other through side portions of the logistics strip 20 on either side of the slots 26. Illustratively, the rivets 50 are secured through the stepped portions 51 of the adjacent panels 16.

Each logistics strip assembly 10 further includes the splicing plate 22 coupled to the outside surface 33 of the outer metal skin 34 of two adjacent panels 16 of the sidewall 14. Each splicing plate 22 defines a long, rectangular sheet of metal including a central portion 60 and side portions 62. The central portion 60 is bowed outwardly away from the outside surface 33 of the outer metal skin 34 of the sidewall 14 such that the central portion 60 and the side portions 62 of the splicing plate 22 are located within different planes. The central portion 60 of the splicing plate 22 is aligned with the gap 15 between the adjacent sidewall panels 16 and is provided to receive a portion of the clip 21 or other attachment device therein when such clip 21 is secured to the logistics strip 20, as shown in FIGS. 6a-6c and FIG. 7. The rivets 50 are received through the side portions 62 of the splicing plate 22 on either side of the central portion 60 such that the sidewall panels 16, logistics strip 20, and splicing plate 22 are all coupled to each other.

As discussed above, the logistics strip assembly 10 further includes an insert 24 associated with each slot 26 of the logistics strip 20. As shown in FIG. 2, a separate insert 24 is associated with each slot 26 such that the logistics strip assembly 10 includes a plurality of inserts 24. Each insert 24 defines a generally rectangular cross-section and is made of compressible foam. Each insert 24 is generally wider and taller than each slot 26. Further, each insert 24 is generally thicker than a thickness, or depth, 37 of the gap 15 between the inside surface 39 of the splicing plate 22 and the outside surface 41 of the logistics strip 20.

In use, each insert 24 is positioned between the splicing plate 22 and the logistics strip 20 at a location that is aligned with one slot 26 of the logistics strip 20 such that once inserted, as shown in FIG. 3, the entire slot 26 of the logistics strip 20 is blocked, or covered, by the insert 24. An adhesive (not shown) may be applied to the outside surface 45 of the insert 24 to adhere the insert 24 to the inside surface 39 of the splicing plate 22. Illustratively, the insert 24 may be positioned within the gap 15 in a retrofit application after the splicing plate 22 and logistics strip 20 have been coupled to adjacent sidewall panels 16 to form the sidewall 14 of the trailer. In such a retrofit application, a user simply deforms, or compresses, the foam insert 24 to force the insert 24 through the slot 26 of the logistics strip 20 and into the gap 15. The compressibility of the insert 24 allows the insert 24 to spring-back to its un-deformed shape in order to fill the space between the splicing plate 22 and the logistics strip 20 in order to lie flush against the outside surface 41 of the logistics strip 20 in order to prevent debris within the storage container of the trailer from entering the gap 15 via the slot 26. The insert 24 may also be positioned during the original manufacture of the sidewall 14 of the trailer such that the insert 24 is positioned on the splicing plate 22 at vertically-spaced locations that will be aligned with slots 26 of the logistics strip 20 once the sidewall 14 is fully assembled. The splicing plate 22, including the inserts 24 placed and/or attached thereto, and the logistics strip 20 may then be coupled to the sides 44 of adjacent sidewall panels 16 using the rivets 50. Illustratively, the insert 24 may be positioned on the splicing plate 22 with or without the use of an adhesive or other fastener in order to maintain the insert 24 in its location until the logistics strip assembly 10 is fully assembled.

Figure 4:
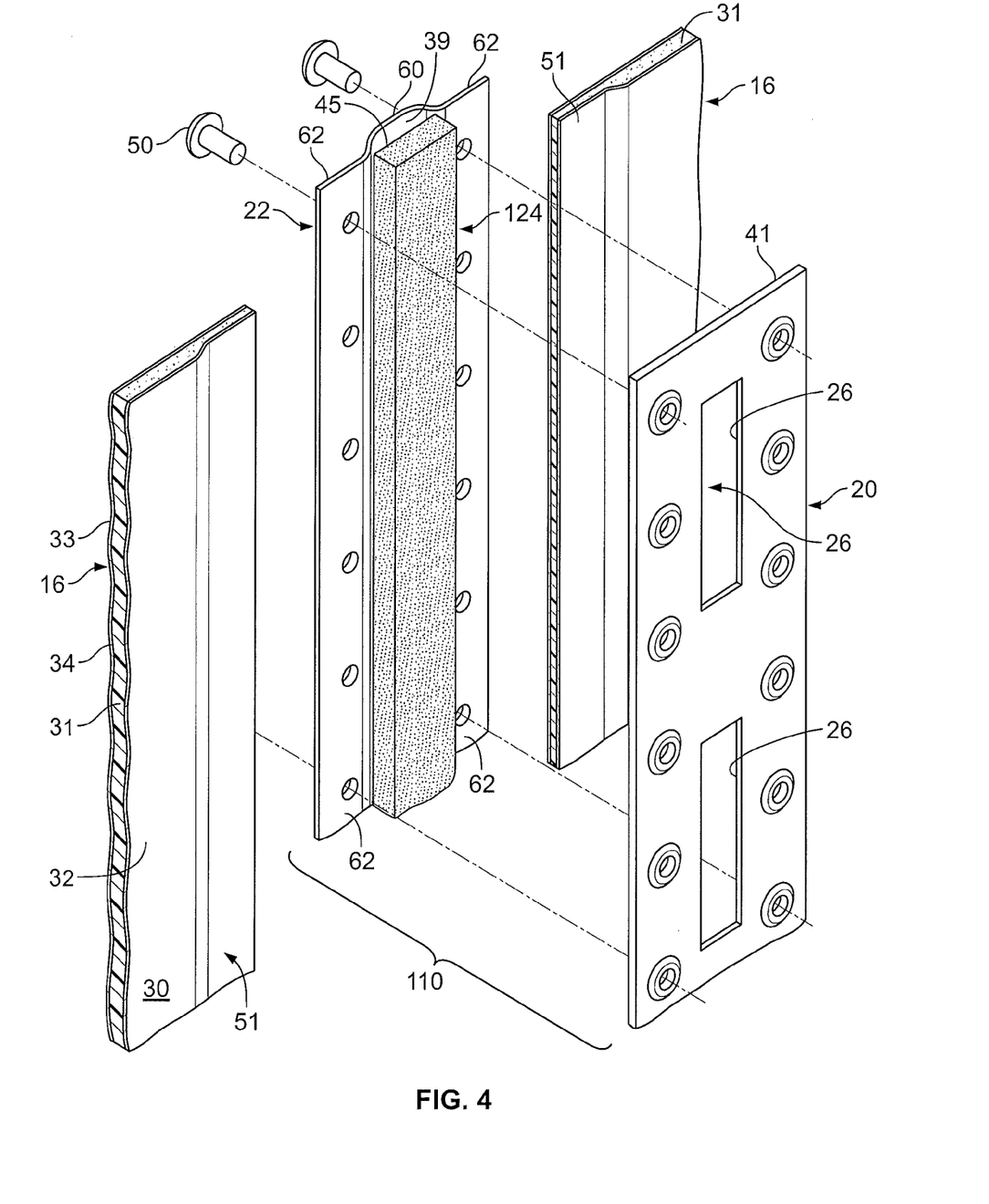
FIG. 4 is an exploded perspective view of a portion of an alternative logistics strip assembly showing a single, alternative foam insert of the assembly positioned between a splicing member of the assembly and the logistics strip.
Figure 5:
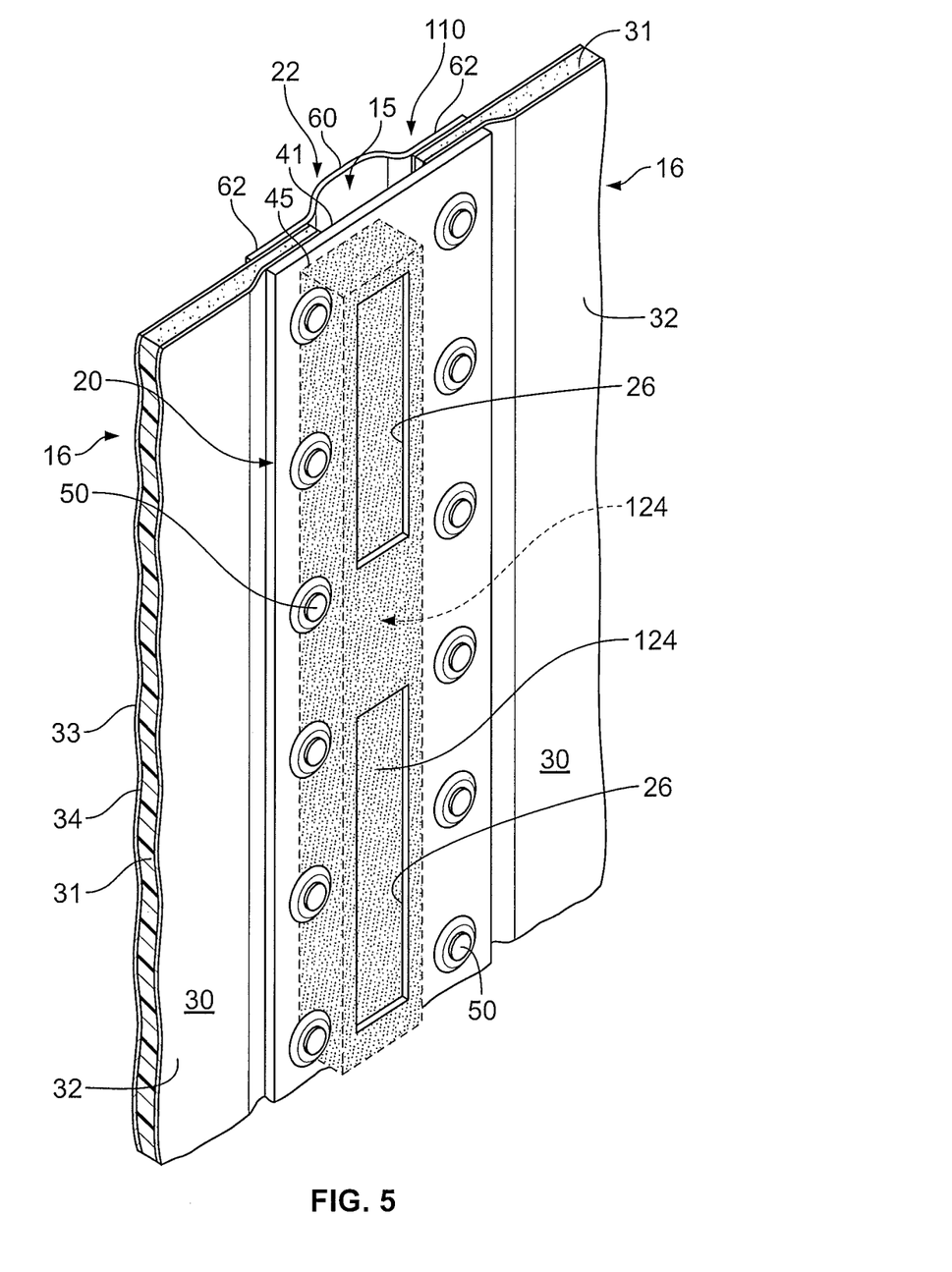
FIG. 5 is a perspective view similar to FIG. 4 showing the assembled logistics strip assembly including the alternative, one-piece foam insert.
Figure 6A:
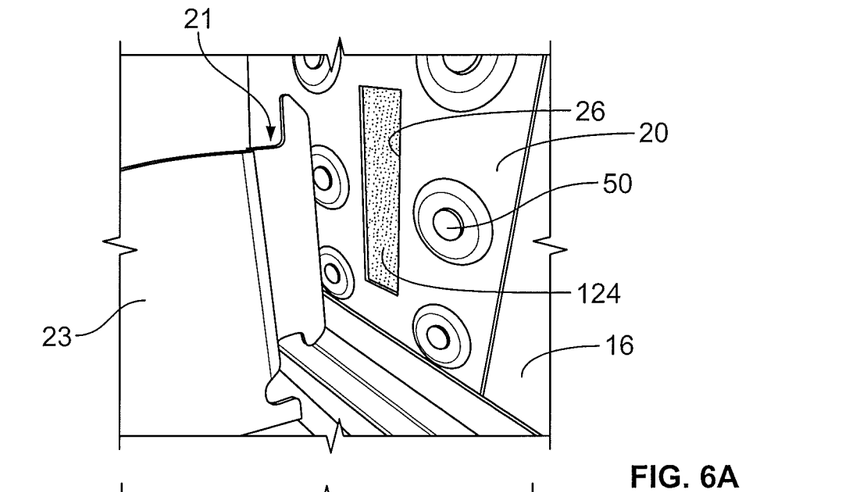
FIGS. 6a-6c include perspective views showing a logistics clip being installed within one of the slots of the logistics strip of FIGS. 4 and 5 and showing the insert within the slot deforming as the clip is inserted into the slot.
Figure 6B:
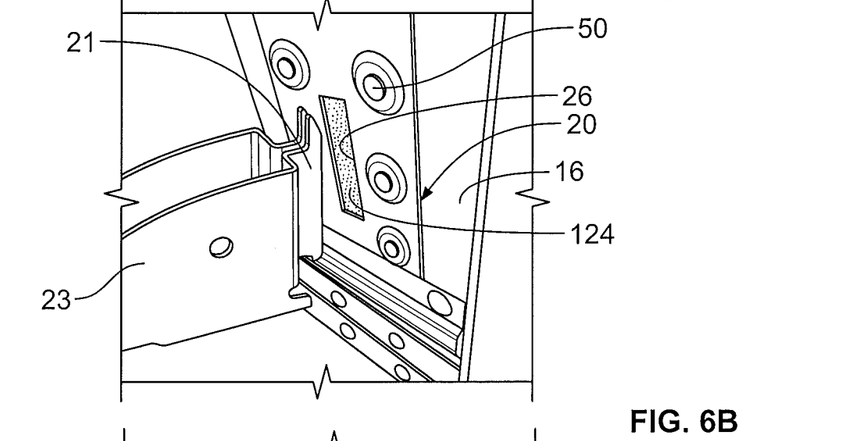
Figure 6C:
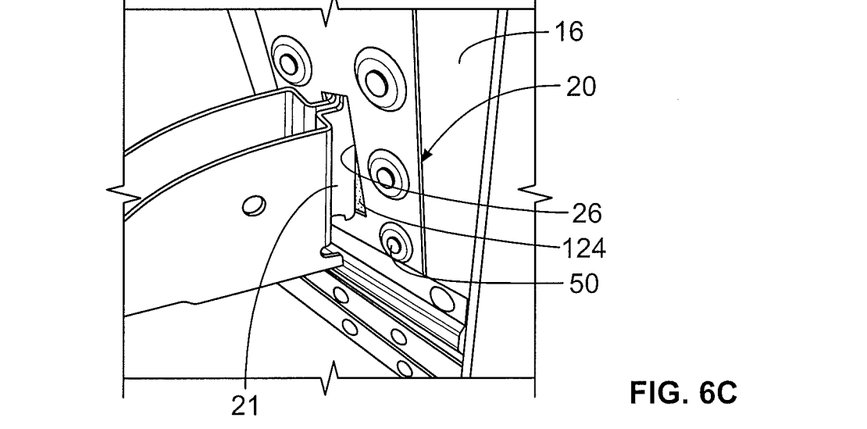

Looking now to FIGS. 4 and 5, an alternative logistics assembly 110 including an alternative insert 124 is provided. The logistics assembly 110 includes many of the same components as the logistics assembly 10 of FIGS. 1-3; as such, like reference numerals are used to denote like components. The insert 124 of the assembly 110 is a single component that extends along substantially the entire length of the logistics strip 20 and the splicing plate 22 in order to be positioned behind and block access through each of the slots 26 of the logistics strip 20. As shown in FIG. 4, the insert 124 is positioned adjacent the inside surface 39 of the splicing plate 22. Any suitable permanent or temporary adhesive (not shown) may be used to adhere the insert 124 to the splicing plate 22 during assembly of the logistics strip assembly 110 thereof. The insert 124 is made of the same or similar foam material as the insert 24. As such, the insert 124 is easily and readily compressible by a user. As shown in FIG. 4, the insert 124 is placed over the center portion 60 of the splicing plate 22 such that the side portions of the rear surface 45 of the insert 124 are adjacent and engaged with a portion of the sides 62 of the splicing plate 22. The logistics strip 20 is then placed over the insert 124 and coupled to the adjacent sidewall panels 16 and splicing plate 22 using the rivets 50, as shown in FIG. 5.

Accordingly, the logistics strip assemblies 10, 110 of FIGS. 1-5 each include an insert 24, 124 that is associated with at least one logistics slot 26 of the logistics strip 20 of the assembly 10, 110. In particular, the assembly 10 includes a plurality of inserts 24 that are each associated with one logistics slot 26 whereas the assembly 110 includes a single insert 124 that is associated with all of the logistics slots 26 of the logistics strip 20. Accordingly, the assembly 10 includes inserts 24 which intermittently fill the gap 15 between the logistics strip 20 and the splicing plate 22 whereas the assembly 110 includes the insert 124 which substantially fills the entire vertical length of the gap 15 between the logistics strip 20 and the splicing plate 22. It should be understood that portions of the gap 15 adjacent the ends of each sidewall panel 16 may remain open such that the foam inserts 24, 124 may be spaced-apart from the ends of each sidewall panel 16. Alternatively, the inserts 24, 124 may be sized to engage the ends of each sidewall panel 16. Regardless, the inserts 24, 124 are positioned to lie adjacent to and engaged with the outer surface 41 of the logistics strip 20 in order to block the slot 24 and prevent debris from entering the gap 15 of the logistics strip assembly 10 via one of the slots 26.

Figure 7:
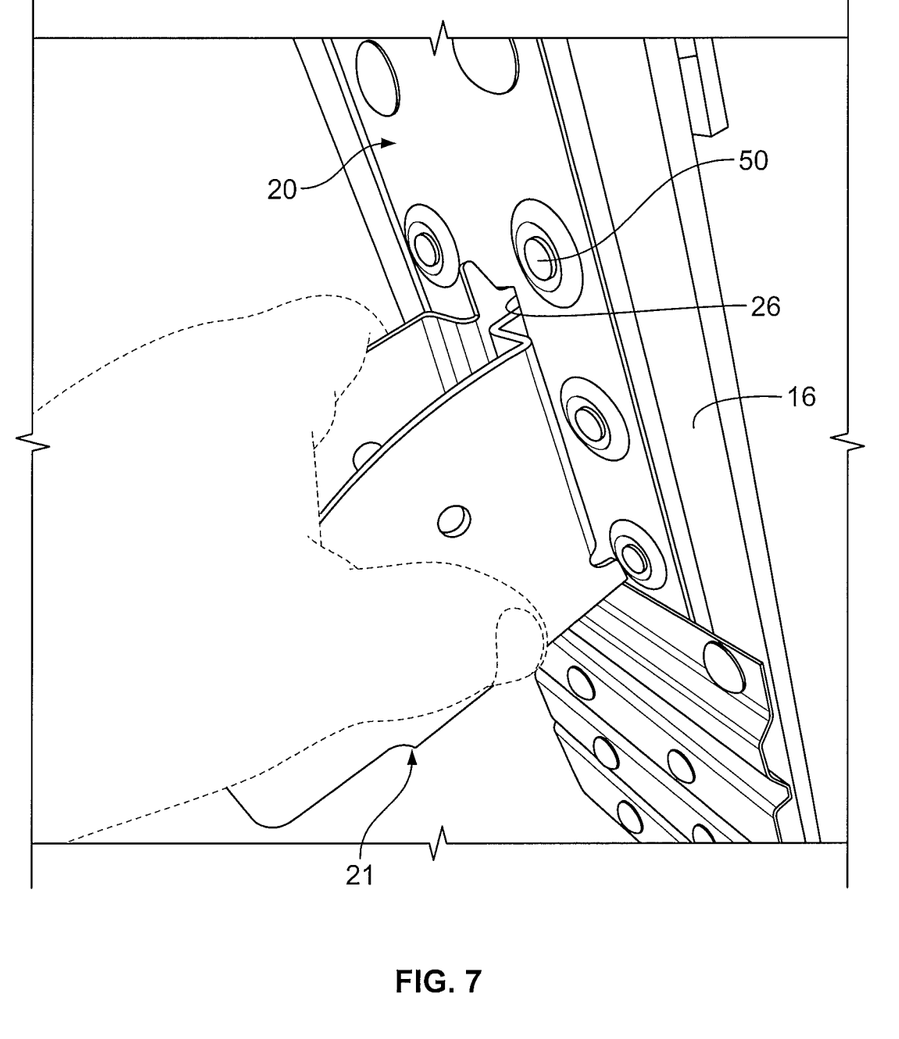
FIG. 7 is a perspective view showing the clip of FIG. 6 installed within one of the slots of the logistics assembly of FIGS. 4-6 to compress a portion of the foam insert of the logistics assembly.

As noted above, the inserts 24, 124 operate to prevent unwanted debris from entering the logistics slots 26 and accumulating within the gap 15 of the logistics slot assembly 10. Such debris may contaminate the cargo within the storage container of the trailer and/or may corrode the logistics strip assembly 10 and/or the sidewall 14 of the trailer. In use, the inserts 24, 124 are engaged with the outside surface 41 of the logistics strip 20 when in their expanded state in order to prevent any debris from entering the slots 48 from the inside of the storage container of the trailer. As shown in FIGS. 6 and 7, a clip 21 of a logistics strap is able to be received through the logistics slots 26 when the inserts 24, 124 are located between the logistics strip 20 and the splicing plate 22. Illustratively, the clip 21 includes a head-end that is inserted into the logistics slot 26 in order to secure the clip to the logistics strip 20. The clip also includes a strap end that is attached to a strap (not shown) which may be used to secure cargo within the storage container of the trailer. Illustrative logistics straps, including logistics clips, that are configured for use with logistics strips for interior trailer securing requirements include, for example, the logistics straps made by Multiprens USA (Kansas City, Kans.). It should be understood that the logistics slots 48 described herein may be sized and configured for use with any suitable logistics strap and logistics clip. Furthermore, all inserts described herein may be seized and configured for use with any such logistics apertures.

As shown in FIGS. 6a-6c and 7, a standard logistics clip 21 is able to be used in its usual manner to be inserted into a slot 26 of the logistics strip 20 in order to couple the cargo strap to the sidewall 14 of the trailer. As the clip 21 is inserted into the slot 26 to secure the slip 21 to the logistics strip 20, the clip 21 compresses and deforms the foam insert 24. Thus, the foam insert 24 does not hinder the attachment of the clip 21 to the logistics strip 20 and allows for normal operation of the logistics slots 26 with a coordinating logistics strap and clip to maintain and meet any interior trailer securing requirements of the user. Once the logistics clip 21 is removed from the logistics slot 26, the foam inserts 24, 124 recover and expand to their original position in order to again block entry of debris from the interior of the storage container through the logistics slots 26.

Illustratively, the inserts 24, 124 are made of a foam material. However, it is within the scope of this disclosure for the inserts 24, 124 to be made from any suitable material that is compressible in order to allow the clip to be received within the slot, and be able to expand back to its original position and shape in order to block entry of debris into the gap 15 through the slot 24, 124.

Illustratively, while the particular inserts 24, 124 of FIGS. 1-7 are made of foam, it should be understood that the insert 24 may be made from any suitable deformable, or flexible, material which operates to block entry of debris into the channel 15 of the logistics strip assembly 10 via the slot 26 while also allowing the logistics clip 21 to be inserted into the slot 26. Further, the insert 24 may be spring-biased within the channel 15 to normally block the slot 26 while also being movable against the bias of the spring to allow the logistics clip 21 to be inserted therein. It should be understood that while the particular inserts 24, 124 define a rectangular cross-section, it is within the scope of this disclosure for the inserts 24, 124 to define a cross-section of any suitable shape in order to substantially cover the logistics slots 26 from a location between the logistics strip 20 and the splicing plate 22. Further, other deformable and elastic materials that recover their shape may be used. It is also within the scope of the disclosure for the foam inserts 24, 124 to include an outer skin over the outer surfaces of the foam in order to close off any open cells of the foam in order to prevent moisture and/or dust or debris from accumulating within the foam inserts 24, 124 themselves.

Figure 8:
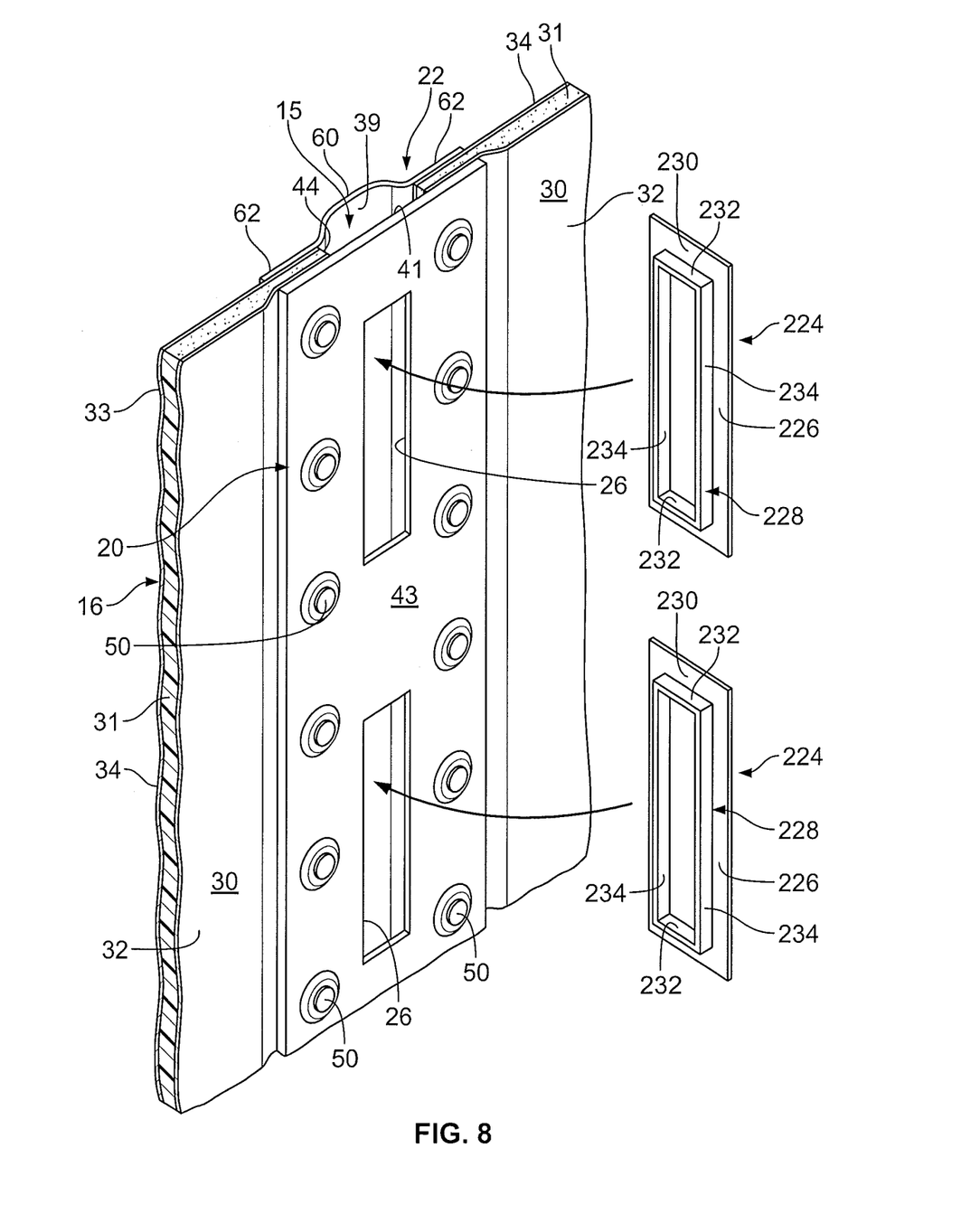
FIG. 8 is an exploded perspective view of a portion of another alternative logistics strip assembly showing an alternative insert of the assembly to be placed within each slot of the logistics strip in order to cover the slot and prevent debris from entering the logistics strip assembly through the slots.
Figure 9:
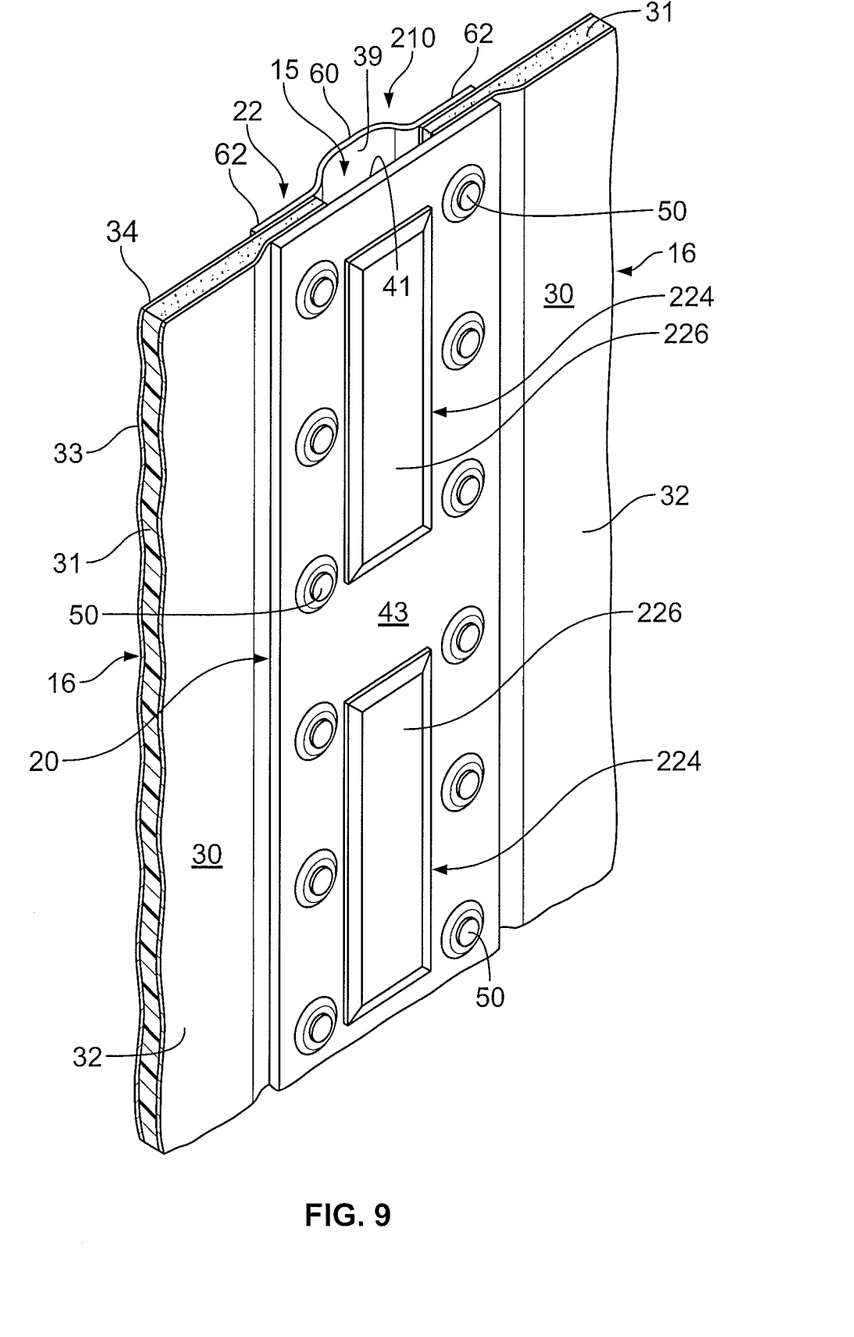
FIG. 9 is a perspective view similar to FIG. 6 showing the alternative inserts covering the respective slots of the logistics strip.

Looking now to FIGS. 8 and 9, another alternative logistics assembly 210 is provided. The logistics assembly includes many of the same or similar components as the logistics assemblies 10, 110; as such, like numerals are used to denote the same or similar components. The alternative logistics assembly 210 includes an alternative insert 224. As shown in FIG. 8, the insert 224 includes a rectangular base 226 and a rectangular lip 228 coupled to an outside surface 230 of the base 226. Illustratively, the rectangular lip 228 includes spaced-apart top and bottom lip portions 232 and spaced-apart side lip portions 234 coupled to the top and bottom lip portions 232. Illustratively the lip 228 is sized and configured to fit through the logistics slot 26 in the logistics strip 20 such that the side lip portions 234 of the lip 228 are adjacent the side edges of the central portion of the logistics strip 20 which define the slot 26, and such that the top and bottom lip portions 232 are adjacent the top and bottom edges of the central portion of the logistics strip 20 which define the slot 26 when the lip 228 of the insert 224 is received through the slot 26. In other words, the insert is able to be snapped into the logistics slot 26. When the lip 228 is received through the slot 26, the outside surface 230 of the rectangular base 226 of the insert 224 is adjacent to and engaged with an inside surface 43 of the central portion of the logistics strip 20 surrounding the slot 26, as shown in FIG. 9. As such, the base 226 is wider and taller than the slot 26 in order to fully cover the slot 48 when the lip 228 is received within the slot 26. Further, an outer perimeter portion of the outer surface of the base 226 is chamfered toward the logistics strip 20 to reduce the protrusion of the plate base 226 into the storage container in order to reduce the risk that an object or cargo within the storage container may catch or snag an edge of the base 226 and unintentionally remove the insert 224 form the slot 48.

Illustratively, the insert 224 is made of plastic. However, it is within the scope of this disclosure for the insert 224 to be made of any suitable material including, for example, a composite, metal, metal alloy, wood and/or a combination thereof. As shown in FIG. 9, when the insert 224 is positioned such that the lip 228 is received through the slot 26 of the logistics strip 20, the slot 26 is covered and any debris from within the storage container is prevented from entering the channel 15 through the slot 26. In the event that a particular slot 26 is needed to secure a logistics strap and clip thereto, such as the clip 21 shown in FIGS. 6 and 7, the user may remove the insert 224 and secure the clip within the slot 26. Once the clip 21 is removed from the slot 26, the insert 224 may be snapped into place over the slot 26 in order to again close the slot 26 and prevent debris from entering the slot 26 and accumulating within the gap 15 between the logistics strip 20 and the splicing plate 22.

Figure 10:
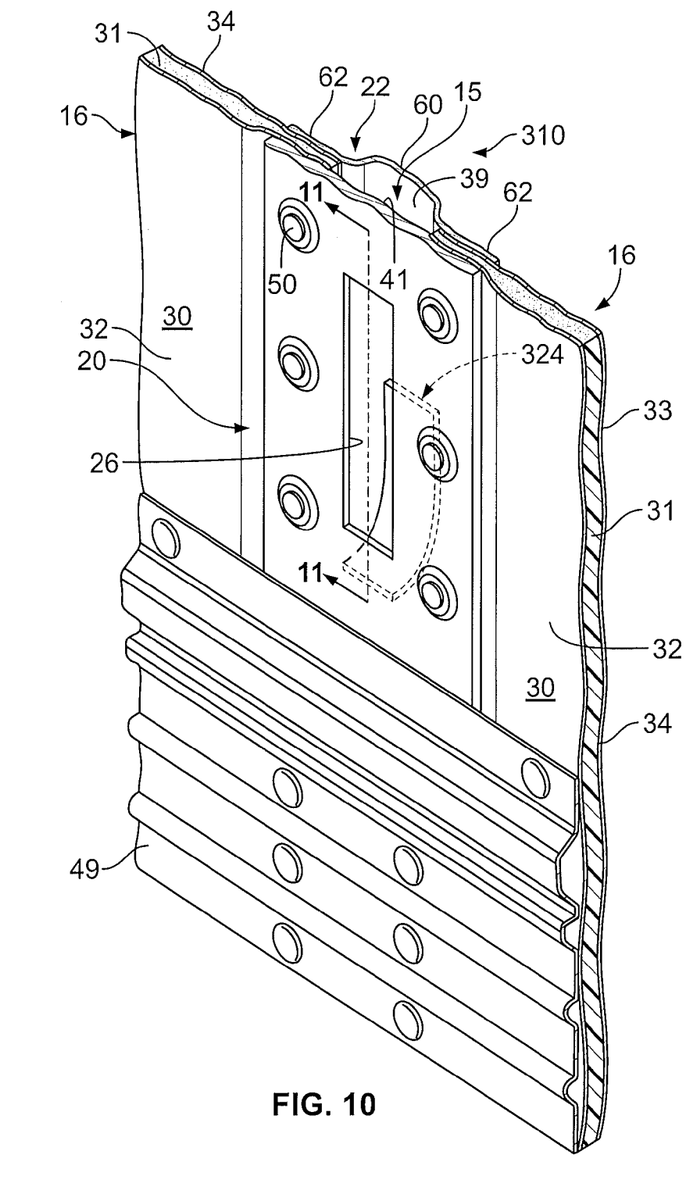
FIG. 10 is a perspective view of a portion of yet another logistics strip assembly showing an alternative insert of the assembly to be placed within the bottom-most slot of the logistics strip of the assembly in order to catch and redirect debris within the logistics strip assembly out the bottom-most slot.
Figure 11:
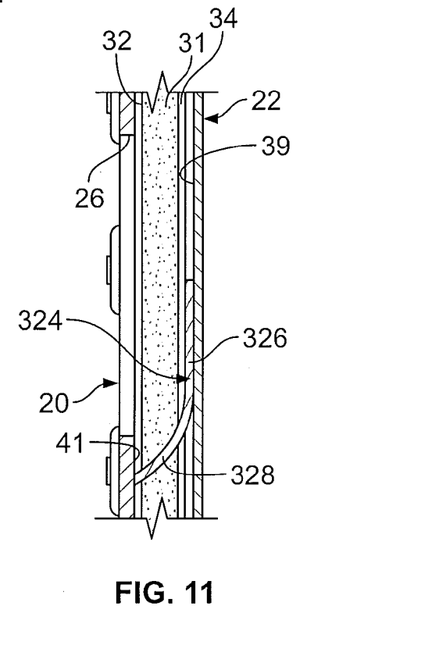
FIG. 11 is a sectional view taken along line 11-11 of FIG. 10.

Looking now to FIGS. 10 and 11, yet another logistics assembly 310 is provided. The logistics assembly 310 includes many of the same or similar components as the logistics assemblies 10, 110, 210 described earlier. As such, the same reference numerals are used to denote the same or similar components. The illustrative logistics assembly 310 of FIGS. 10 and 11 includes an alternative insert 324. The insert 324 is located only within the bottom-most slot 26 of the logistics strip 20 and is provided to catch any debris which enters into the gap 15 via any one of the logistics slots 26. As is described in more detail below, the insert 324 also redirects any debris that is caught to exit out the channel 15 through the bottom-most slot 48 in order to prevent the gap 15 from accumulating and filling up with debris.

As shown in FIGS. 10 and 11, the insert 324 is generally J-shaped when viewed from the side and includes a straight, vertical portion 326 and a curved portion 328 coupled to the straight, vertical portion 326. Illustratively, the vertical portion 326 is coupled to the inner surface 39 of the splicing plate 22 at a location that is generally aligned with the bottom-most slot 48 of the logistics strip 20. The curved portion 328 of the insert 324 is then configured to curve toward the logistics strip 20 to engage an outer surface 41 of the center portion of the logistics strip 20 below the bottom-most slot 48, as shown in FIG. 11. The vertical portion 326 may be coupled to the splicing plate 22 by using an adhesive and/or a mechanical fastener such as a rivet, screw, or nail, for example. The insert 324 may be made of plastic, a metal, metal alloy, or any combination thereof.

As noted above, the insert catches and redirects debris which has fallen into the gap 15 to exit the gap 15 through the bottom-most slot 26 of the logistics strip 20. Thus, the insert 324 does not operate to prevent debris from entering the gap 15 via one or more slots 26 of the logistics strip 20 in the manner that the inserts 24, 124, 224 operate to prevent debris from entering the gap 15 via the slots 26. Rather, debris is allowed to enter the slots 26, and the insert 324 then operates to catch and direct the debris that falls into the gap 15 through the upper slots 26 to exit the gap 15 out the bottom-most slot 26 in order to prevent the gap 15, and particularly the portion of the gap 15 adjacent the base rail 49, from accumulating with debris.

Illustratively, as shown in FIG. 11, the vertical portion 326 of the insert 324 is spaced away from the slot 26 of the logistics plate 20 in order to allow the logistics clip 21 of a logistics strap to be inserted into the slot 26. In other words, the insert 324 does not interfere with the use of the logistics clip 21 as the clip 21 is inserted and removed from the bottom-most slot 26 of the logistics strip 20. Further, while the insert 324 is shown for use with the bottom-most logistics slot 26, it is within the scope of this disclosure to provide the insert 324 for use with any of the logistics slots 26 of the logistics strip 20 in order to prevent debris that enters through that slot 26, or any slot 26 thereabove, from falling to the bottom of the gap 15 and collecting at the bottom of the gap 15 to cause possible contamination and/or corrosion. In other words, the logistics strip 310 may include any number of inserts 324 associated with any of the slots 26 of the strip 310.

Although the logistics strip assemblies 10, 110, 210, 310 disclosed herein each include the illustrative logistics strip 20 and splicing plate 22, it is within the scope of this disclosure for the inserts 24, 124, 224, 324 disclosed herein to be used with any suitable logistics strip and/or splicing plate. In particular, the inserts 24, 124, 224, 324 may be used with logistics assemblies including horizontal logistics strips and splicing plates as well as with intermediate logistics assemblies which are located between the side ends of a wall panel rather than at the joint between the wall panels of a sidewall of a trailer, for example. Illustratively, for example, the inserts 24, 124, 224, 324 may be used with the logistics strips and splicing plates disclosed in the following U.S. Pat. Nos. 7,931,328; 7,134,820; 7,069,702; 8,006,386; and 8,506,221, the entirety of each of which is expressly incorporated by reference herein. Further, the inserts 24, 124, 224, 324 of the present disclosure may be used to fill, or block, any aperture within a sidewall, or any other wall, of a trailer. In other words, the inserts 24, 124, 224, 324 may be used to fill or block apertures in a trailer that may or may not be associated with a logistics strip and/or a splicing plate.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A logistics assembly configured to be coupled to a sidewall of a trailer, comprising:
    a logistics strip configured to be coupled to an inside surface the sidewall of the trailer, the logistics strip including a plurality of vertically-spaced slots;
    a splicing plate configured to be coupled to an outside surface the sidewall of the trailer and spaced-apart from the logistics strip to define a channel therebetween, wherein the plurality of vertically-spaced slots are aligned with the channel; and
    an insert engaged with the logistics strip and the splicing plate, wherein the insert is configured to block access from inside the trailer through at least one slot of the logistics strip in order to prevent debris from entering through the slot and into a channel between the logistics strip and the splicing plate, wherein the insert is a deformable foam piece that is sized such that, upon compression, the foam piece is removably insertable through the at least one slot and thereafter expands to fill the channel.

2. The logistics assembly of claim 1, wherein the insert is engaged with an edge of the logistics strip defining at least one of the plurality of slots.

3. The logistics assembly of claim 1, wherein the insert defines a height and a width that is greater than a height and a width of the at least one slot.

4. The logistics assembly of claim 1, wherein the foam includes an outer surface having an adhesive attached thereto, and wherein the foam is adhesively coupled to the splicing plate.

5. The logistics assembly of claim 1, further comprising a plurality of inserts, and wherein each insert is configured for use with each one of the plurality of vertically-spaced slots of the logistics strip.

6. The logistics assembly of claim 1, wherein the insert is configured to be deformed by hand and inserted from the inside of the trailer through the logistics slot and into the channel between the logistics strip and the splicing plate.

7. The logistics assembly of claim 1, wherein the insert defines a length substantially the same as a length of the logistics strip such that the insert blocks each of the plurality of logistics slots of the logistics strip.

8. The logistics assembly of claim 1, wherein the insert is adhesively coupled to the splicing plate.

9. A logistics assembly configured to be coupled to a sidewall of a trailer, comprising:
    a logistics strip configured to be coupled to an inside surface the sidewall of the trailer, the logistics strip including a plurality of vertically-spaced slots;
    a splicing plate configured to be coupled to an outside surface the sidewall of the trailer and spaced-apart from the logistics strip to define a channel therebetween, wherein the plurality of vertically-spaced slots are aligned with the channel; and
    an insert engaged with the logistics strip and the splicing plate, wherein the insert is configured to block access from inside the trailer through at least one slot of the logistics strip in order to prevent debris from entering through the slot and into a channel between the logistics strip and the splicing plate, wherein the insert includes a plate configured to be placed over the slot and a lip configured to be placed within the slot in order to secure the insert over the slot.

10. The logistics assembly of claim 9, wherein the insert is removably coupled to the logistics strip.

11. A logistics assembly configured to be coupled to a sidewall of a trailer, comprising:
    a logistics strip configured to be coupled to an inside surface the sidewall of the trailer, the logistics strip including a plurality of vertically-spaced slots;
    a splicing plate configured to be coupled to an outside surface the sidewall of the trailer and spaced-apart from the logistics strip to define a channel therebetween, wherein the plurality of vertically-spaced slots are aligned with the channel; and
    an insert engaged with the logistics strip and the splicing plate, wherein the insert is configured to allow access from inside the trailer through at least one slot of the logistics strip in order to allow debris to enter through the slot and into a channel between the logistics strip and the splicing plate,
    wherein the insert is positioned within the channel between the logistics strip and the splicing plate, and
    wherein the insert includes a vertical portion adjacent to an inner surface of the splicing plate and a curved portion curved toward the outside surface of the logistics strip, and wherein debris which enters the channel is captured by the insert and urged to exit the logistics slot.

12. The logistics assembly of claim 11, wherein the insert is aligned with a bottom-most slot of the plurality of logistics slots.

* * * * *